US006920082B2

(12) United States Patent
Tang

(10) Patent No.: US 6,920,082 B2
(45) Date of Patent: Jul. 19, 2005

(54) METHOD AND APPARATUS FOR DETERMINING EARTH FORMATION SHEAR-WAVE TRANSVERSE ISOTROPY FROM BOREHOLE STONELEY-WAVE MEASUREMENTS

(75) Inventor: Xiao Ming Tang, Sugar Land, TX (US)

(73) Assignee: Baker Hughes Incorporated, Houston, TX (US)

(*) Notice: Subject to any disclaimer, the term of this patent is extended or adjusted under 35 U.S.C. 154(b) by 509 days.

(21) Appl. No.: 10/184,196

(22) Filed: Jun. 27, 2002

(65) Prior Publication Data

US 2004/0001389 A1 Jan. 1, 2004

(51) Int. Cl.$^7$ .................................................. G01V 1/00
(52) U.S. Cl. ............................ 367/31; 367/25; 367/27; 372/6; 372/11; 372/13
(58) Field of Search ............................. 367/25, 27, 31, 367/75; 702/6, 11, 13, 18

(56) References Cited

U.S. PATENT DOCUMENTS

| 4,633,449 A | * | 12/1986 | Ingram et al. | 367/75 |
|---|---|---|---|---|
| 4,779,236 A | | 10/1988 | Sondergeld | 367/31 |
| 4,797,859 A | | 1/1989 | Hornby | 367/31 |
| 5,278,805 A | | 1/1994 | Kimball | 367/32 |
| 5,289,433 A | | 2/1994 | Cowles et al. | 367/34 |
| 5,475,650 A | | 12/1995 | Sinha et al. | 367/31 |
| 5,485,431 A | * | 1/1996 | Johnson et al. | 367/30 |
| 5,999,484 A | | 12/1999 | Kimball et al. | 367/31 |
| 6,351,991 B1 | * | 3/2002 | Sinha | 73/152.01 |
| 2003/0167835 A1 | * | 9/2003 | Sinha et al. | 73/152.16 |

OTHER PUBLICATIONS

Tang, X.; "Determining formation shear–wave tranverse isotropy from borehole Stoneley wave measurements", Geopysics, vo 68, 190 1, PP 118–126, Jan. 2003.*

Moinard et al, "Permeability quantification from borehole Stoneley waves", 2nd India oil & natural gas corp. Conf., Jan. 12, 1997, vol. 1, pp 547–558.*

A. N. Norris; *The speed of a tube wave*, The Journal of the Acoustical Society of America 87(1), Jan. 1990, pp. 414–417.

J. E. White et al.; *Cylindrical waves in transversely isotropic media*, The Journal of the Acoustical Society of America 70(4), Oct. 1981, pp. 1147–1155.

Denis P. Schmitt, *Acoustic multipole logging in–transversely isotropic poroelastic formations*, The Journal of the Acoustical Society of America 86(6), Dec. 1989, pp. 2397–2421.

(Continued)

Primary Examiner—Nelson Moskowitz
(74) Attorney, Agent, or Firm—Madan, Mossman & Sriram, P.C.

(57) ABSTRACT

The present invention is a method of determining formation horizontal shear wave velocity, formation transverse isotropy and an effective logging tool modulus. The method comprises determining an effective logging tool modulus by modeling the logging tool as a fluid filled cylindrical shell. Measured Stoneley-wave slowness values are acquired for a formation. A horizontal formation shear wave velocity, $V_{sh}$, is calculated as a function of the measured Stoneley-wave slowness and an estimated Stoneley-wave slowness wherein the estimated average Stoneley-wave slowness is computed using the effective tool modulus. A difference between the measured Stoneley-wave slowness and the estimated Stoneley-wave slowness is minimized and the horizontal shear-wave velocity value for the minimized difference is output. Transverse isotropy may be then be calculated as a function of the determined $V_{sh}$ and vertical shear wave velocity, $V_{sv}$, determined from standard logging techniques.

19 Claims, 10 Drawing Sheets

(4 of 10 Drawing Sheet(s) Filed in Color)

OTHER PUBLICATIONS

X.M. Tang et al.; *Effects of a Logging Tool on the Stoneley Waves in Elastic and Porous Boreholes*, The Log Analyst, vol. 34, No. 5, Society of Professional Well Log Analysts, Sep.–Oct. 1993, pp. 46–56.

X.M. Tang et al.; *Dynamic permeability and borehole Stoneley waves: A simplified Biot–Rosenbaum model*, The Journal of the Acoustical Society of America 90(3), Sep. 1991, pp. 1632–1646.

Chuen Hon Cheng et al.; *Determination of In Situ Attenuation From Full Waveform Acoustic Logs*, Journal of Geophysical Research, vol. 87, No. B7, pp. 5477–5484, Jul. 10, 1982.

Karl J. Ellefsen et al.; *Elastic Wave Propagation along a Borehole in an Anisotropic Medium*, 60th Ann. International Mtg.: Soc. of Expl. Geophys., pp. 14–17, 4 Figures.

Christopher V. Kimball et al.; *Semblance processing of borehole acoustic array data*, Geophysics, vol. 49, No. 3, Mar. 1984, pp. 274–281, 7 Figures.

Andrew N. Norris et al.; *Weak elastic anisotropy and the tube wave*, Geophysics, vol. 58, No. 8, Aug. 1993, pp. 1091–1098, 6 Figures.

J. E. White et al.; *Computed Waveforms in Transversely Isotropic Media II. Horizontal Point Force*, 52nd Ann. Internat. Mtg.: Soc. of Expl. Geophys., 1982, Session:S13.1.

Xiao Ming Tang; *Predictive processing of array acoustic waveform data*, Geophysics, vol. 62, No. 6, Nov.–Dec. 1997, pp. 1710–1714, 4 Figures.

X. M. Tang; *Determining Shear–wave Transverse Isotropy From Borehole Stoneley Waves*, SEG Meeting, Sep. 2001, pp. 1–4, 3 Figures.

Tim Geerits et al.; *The effect of tool on dipole logging*, 67th Ann. Internat. Mtg.: Soc. of Expl. Geophys. pp. 313–316, 6 Figures.

Leon Thomsen; *Weak elastic anisotropy*, Geophysics, vol. 51, No. 10, Oct. 1986, pp. 1954–1966, 5 Figures, 1 Table.

Zhijing (Zee) Wang; *Seismic anisotropy in sedimentary rocks*, 71st Ann. Internat. Mtg.: Soc. of Expl. Geophys., Sep. 2001, pp. 1740–1743, 4 Figures.

\* cited by examiner

METHOD AND APPARATUS FOR DETERMINING EARTH FORMATION SHEAR-WAVE TRANSVERSE ISOTROPY FROM BOREHOLE STONELEY-WAVE MEASUREMENTS

FIELD OF THE INVENTION

This invention generally relates to a method and apparatus for measuring and processing a characteristic of subsurface earth formations penetrated by a borehole. More specifically this invention relates to a method and apparatus for measuring and processing an acoustic characteristic such as slowness of subsurface sonic waves after these waves traverse earth formations adjoining a borehole or passing through a portion of the subsurface.

BACKGROUND OF THE INVENTION

Sonic wave information is used by the oil industry to examine and evaluate the earth's subsurface in the exploration and evaluation of valuable oil and gas, or hydrocarbon, reservoirs. Sonic waves are generated and recorded in oil well logging. This is called sonic or acoustic logging. The sonic wave measurement taken in well boreholes is typically the formation compressional slowness (the reciprocal of velocity). However, many different acoustic wave types may measured, for example shear waves and Stoneley waves.

Acoustic logging is performed in order to resolve the slowness or velocity structure of subsurface earth formations. One aspect of the velocity structure is that subsurface earth formations may be directional in nature such that velocities vary depending on the direction of acoustic wave propagation and the polarization of the wave. This variance in velocity structure due to direction of wave propagation is called seismic anisotropy. The subsurface earth formation information accuracy or resolution of velocity structure that is possible is directly related to both the acquisition and the processing of the acquired data for the sake of accurately locating the subsurface oil and gas reservoirs.

Seismic wave anisotropy plays an increasingly important role in the exploration and production of hydrocarbon reservoirs. In seismic exploration, information about the earth formation anisotropy is needed to accurately delineate the reservoir from seismic wave data. In formation evaluation using borehole measurements, the anisotropy provides an important indication of pay zones, laminations and fractures. Determining seismic wave anisotropy from borehole acoustic wave measurements is thus an important task.

SUMMARY

The present invention is method of using an acoustic logging tool conveyed in a borehole in a formation for determining a characteristic of the formation, the logging tool having at least one source and a plurality of receivers. An effective tool modulus value for the logging tool is determined. An Stoneley-wave slowness from array Stoneley wave data is measured. A horizontal formation shear velocity, $V_{sh}$, is calculated as a function of the measured Stoneley-wave slowness and an estimated Stoneley-wave slowness. The estimated Stoneley-wave slowness is computed using the effective tool modulus value. A shear-wave transverse isotropy for the formation may be calculated using the calculated horizontal shear-wave value, $V_{sh}$, and a vertical shear wave value, $V_{sv}$, from standard logging techniques.

BRIEF DESCRIPTION OF THE DRAWINGS

The patent or application file contain at least one drawing executed in color. Copies of this patent or patent application publication with color drawing(s) will be provided by the Office upon request and payment of the necessary fee.

The present invention and its advantages will be better understood by referring to the following detailed description and the attached drawings in which.

Figure 1:
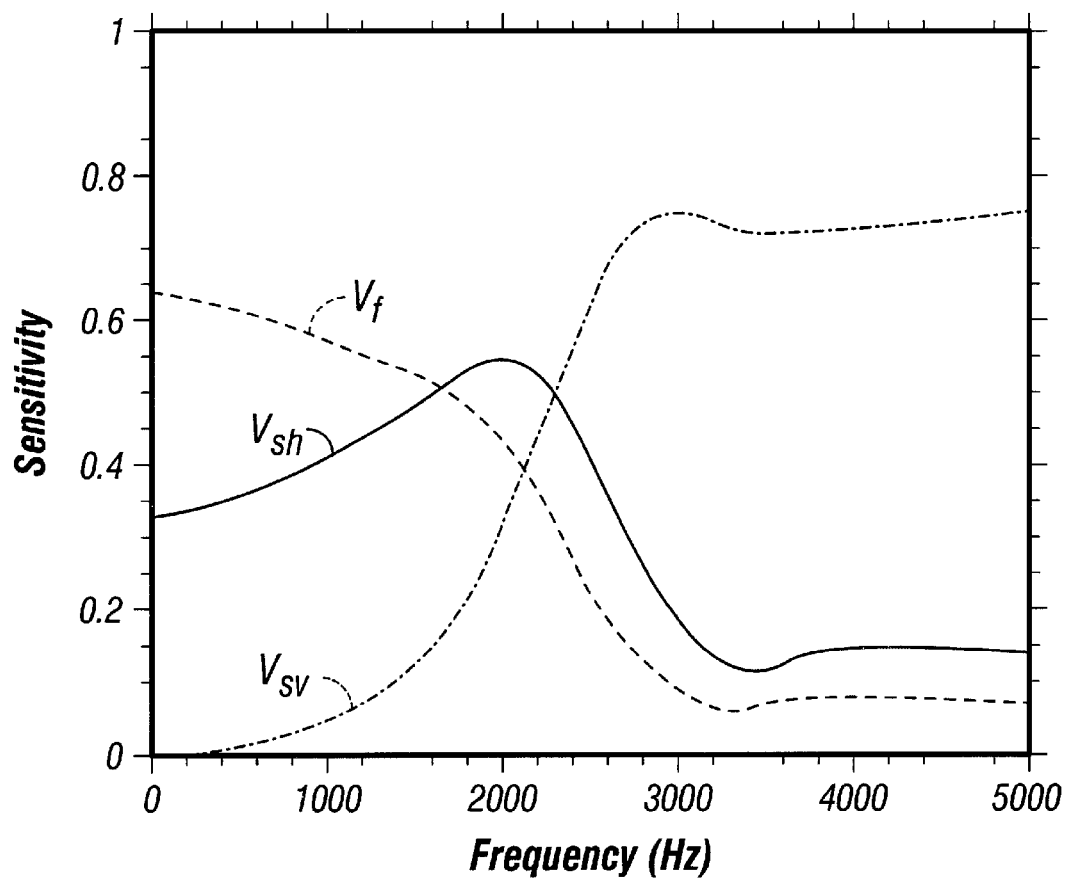
FIG. 1 Illustrates Stoneley wave sensitivity for a fluid-filled borehole with a TI formation.

While the invention will be described in connection with its preferred embodiments, it will be understood that the invention is not limited thereto. On the contrary, it is intended to cover all alternatives, modifications, and equivalents which may be included within the spirit and scope of the invention, as defined by the appended claims.

DETAILED DESCRIPTION OF THE PREFERRED EMBODIMENTS

The present invention derives earth formation horizontal shear-wave slowness or velocity profiles from the acoustic data measured by an array acoustic tool. The derived horizontal shear-wave slowness is then used to determine earth formation shear wave anisotropy, by the virtue of determining transverse isotropic (TI) effects. The present invention takes advantage of the characteristic of Stoneley waves as these waves are the only borehole wave mode that has a significant sensitivity to transverse isotropic effects, especially when the formation is acoustically slow compared to borehole fluid.

Many earth formation rocks exhibit anisotropic wave characteristics. A very common scenario is the anisotropy existing in many sedimentary rocks, such as shales. In many, if not most, cases anisotropy is modeled by its simplest form: Transverse Isotropy (TI). The TI anisotropy has a symmetry axis such that along any direction transverse to this axis one will see the same material property for a selected polarization (i.e., seismic wave velocity/slowness). Between the symmetry axis and any direction perpendicular to it, one will see a material property difference. A TI formation is described by five elastic constants:

$$[c_{11}, c_{13}, c_{33}, c_{44}, c_{66}] \quad (1)$$

The present invention is directed to resolving the last two parameters, $c_{44}$ and $c_{66}$, which are related to the shear-wave propagation in a TI medium. Acoustic logging in a borehole surrounded by a TI formation (axis of symmetry coinciding with borehole) has been studied, among others, by White and Tongtaow (1981) and Tongtaow (1982) for the monopole case, and by Ellefsen (1990) for the multipole (monopole, dipole, and quadrupole) cases. Schmitt (1989) extended the work to study multipole-wave propagation in poro-elastic formations where both the elastic parameters and permeability have the TI characteristics.

For almost all types of borehole acoustic waves, acoustic logging can only determine the vertical wave propagation velocity. The commonly used acoustic waves are: P- and S-waves in monopole logging, the flexural wave from dipole logging, and the screw wave from quadrupole logging, etc. The vertical propagation wave velocity is $V_p = \sqrt{c_{33}/\rho}$ for the P wave, and is $V_{sv} = \sqrt{c_{44}/\rho}$ for the S wave (including flexural and screw waves). This is because most borehole waves (monopole and dipole, etc.) involve wave motion or vibration transverse to the borehole. The only exception is the Stoneley wave. At low frequencies, the Stoneley wave, or tube wave, involves radial displacements that distort the circumference of the borehole. This circumferential distortion involves the shear modulus $c_{66}$. In fact, White and Tongtaow (1981) showed that the low-frequency limit of the tube-wave velocity is $$V_{ST} = V_f / \sqrt{1 + \rho_f V_f^2 / c_{66}},$$

($V_f$ and $\rho_f$ are borehole fluid velocity and density, respectively), which is controlled by $c_{66}$, and is therefore related to horizontally rather than vertically propagating shear waves.

TABLE I

Formation TI constants, borehole fluid modulus (in GPa), and hole radius (in m) used in FIGS. 1 and 2.

| $c_{11}$ | $c_{33}$ | $c_{13}$ | $c_{44}$ | $c_{66}$ | $K_f$ | R |
|---|---|---|---|---|---|---|
| 23.87 | 15.33 | 9.79 | 2.77 | 4.27 | 2.25 | 0.1 |

To further demonstrate the sensitivity of the Stoneley wave to $c_{66}$ over the frequency range of interest (0–5 kHz), FIG. 1 plots the wave's phase velocity sensitivity in a slow TI formation (see Table I) to three controlling parameters: the borehole fluid velocity $V_f$, formation horizontal shear velocity $V_{sh} = \sqrt{c_{66}/\rho}$, and vertical shear velocity $V_{sv} = \sqrt{c_{44}/\rho}$. The sensitivity is defined as the normalized velocity partial derivatives $[V_\gamma/V_{ST}(\omega)][\partial V_{ST}(\omega)/\partial V_\gamma]$, where the subscript $\gamma$ denotes the subscripts f, sv, and sh respectively. The Stoneley wave phase velocity $V_{ST}(\omega)$ is calculated using the dispersion equation (given in Equation 5 below) in the absence of a logging tool. As FIG. 1 shows, Stoneley wave sensitivity to the TI formation is mostly controlled by $V_{sh}$ or $c_{66}$ at low frequencies. Only at higher frequencies, does $V_{sv}$ or $c_{44}$ become an important parameter to affect the wave propagation. The borehole fluid velocity $V_f$ is a dominating parameter at low frequencies. It can be seen that the sum of the three sensitivity curves is close to 1, especially at low frequencies (below 1.5 kHz). According to the theory of partition coefficients (equivalent to the normalized velocity partial derivatives, see Cheng et al., 1982), this indicates that the Stoneley wave sensitivity to other TI parameters, $c_{11}$, $c_{13}$, and $c_{33}$, is low for this slow TI formation.

Because of the sensitivity of the Stoneley wave to $c_{66}$ of a TI formation, it is desirable to estimate the TI parameter from borehole acoustic logging data, as this will yield a continuous log profile for assessing the formation anisotropic characteristics (Ellefsen, 1990). Although the effects of TI on the Stoneley wave is well understood from the theoretical analyses, application of the theory to real acoustic logging data has been hindered by two major factors. The first is the lack of understanding for the effect of a compliant logging tool on the Stoneley wave propagation and an effective model to handle the effect. The second is the lack of an efficient inversion method to estimate the TI effects from the Stoneley wave data. The method of the present invention addresses these two problems.

The acoustic logging tool is modeled as a cylindrically-shaped structure, for example a cylindrical rod, with an effective modulus, which can be determined using a calibration method. This cylindrically-shaped structure model gives a good approximation when compared with exact solution of a cylindrical shell model. With this approach, the effects of the tool can be accounted for regardless of the actual structure and make-up of the tool. In the inversion processing of the Stoneley wave data, the Stoneley wave slowness is a weighted average of the Stoneley wave dispersion curve over the wave's frequency band. This provides a fast and effective method for the inversion. With this method and the known tool modulus and other formation and borehole parameters, $V_{sh}$ or $c_{66}$ can be efficiently and reliably estimated.

Application of the method of this invention to Stoneley wave logging data yields a continuous profile for the shear-wave TI parameter, commonly known as the Thomsen parameter $\gamma$ (Thomsen, 1986). Many shale formations exhibit a substantial TI characteristic, with $\gamma$ reaching the value of 40%. A specific example for the Lewis shale formation in Braggs, Wyo. is presented. The obtained profile provides valuable information for seismic data processing and interpretation, as this indicates where and when anisotropy needs to be considered when migrating the seismic data to image subsurface reservoirs.

Stoneley wave propagation in a TI formation with a logging tool may be modeled. Acoustic logging in a vertical well with a transversely isotropic formation has been theoretically analyzed [see White and Tongtaow (1981); Tongtaow (1982); Ellefsen (1990)]. Although the analyses are very complicated as compared with the isotropic case, analytical solutions can still be derived to describe the wave propagation. The main focus of this section is to further develop the analyses to incorporate the presence of an acoustic-logging tool in the borehole. A common practice was to model the tool as a rigid rod of radius $\alpha$ (Tang and Cheng, 1993), which is appropriate when the tool housing is made of steel that is almost incompressible compared to borehole fluid (Norris, 1990). Modern multi-pole (monopole and dipole) array acoustic tools, however, are quite compliant because of the requirement to isolate wave propagation along the tool during dipole logging (e.g., Cowles et al., 1994). The tool compliance will have a substantial effect on the Stoneley wave propagation during monopole logging. The tool's compliance effect needs to be accounted for in the analysis of Stoneley wave data acquired by a logging tool.

The model of a logging tool should provide a simple and sufficiently accurate description of the tool compliance effects. The actual tool make-up is quite complicated. It may be slotted or cut to allow coupling of receivers to borehole fluid. The tool may also contain sound isolation materials and electronics, etc. However, if the wavelength is long compared to the diameter of the tool, the tool can be effectively modeled as an elastic rod for the Stoneley wave propagation. Further, at low frequencies, the tool's elasticity can be adequately modeled by an effective modulus, as will be described in the following analysis.

Consider an acoustic wave propagating along a borehole containing a logging tool of radius $\alpha$. The borehole wave will induce acoustic motion in the fluid annulus between the tool and formation (modeled as a TI medium). For the Stoneley wave problem, the general solution for fluid radial displacement u and pressure p is given by (Ellefsen, 1990)

$$\left.\begin{array}{l} u \\ p \end{array}\right\} = \left\{\begin{array}{l} AfI_1(fr) - BfK_1(fr) \\ \rho_f \omega^2 [AI_0(fr) + BK_0(fr)] \end{array}\right., (a < r < R) \quad (2)$$

where $$f = (k^2 - \omega^2/V_f^2)^{\frac{1}{2}}$$

is the radial acoustic wavenumber in fluid and r is the radial distance in the fluid annulus between tool radius a and borehole radius R; The symbols k, $\omega$, $V_f$, and $\rho_f$ denote axial wavenumber, angular frequency, fluid acoustic velocity, and fluid density, respectively; $I_n$ and $K_n$ (n=0,1) denote the first and second kind modified Bessel functions of the nth order, respectively; The wave amplitude coefficients A and B are to be determined by the boundary conditions at the tool (r=$\alpha$) and borehole (r=R) interfaces.

Using a quasi-static analysis, Norris (1990) showed that borehole fluid conductance (defined as u/p) of an elastic rod concentric with the borehole is given by $$\left(\frac{u}{p}\right)_{r=a} = -\frac{a}{M_T}, \quad (3)$$

where $M_T$ is a tool modulus, which, in this elastic rod case, is approximately given by the rod's Young's modulus E and Poisson's ratio v, as $M_T \approx E/(1-v)$. Equation (3) is extended to the frequency regime assuming that (1), the quasi-static result still holds for low-frequency Stoneley waves and (2), the compliance of a cylindrical tool can be modeled by an effective modulus $M_T$ regardless of the tool's internal structure. Equations (2) and (3) give a relation between the unknown coefficients, as $$\frac{B}{A} = \frac{(M_T/a)fI_1(fa) + \rho_f \omega^2 I_0(fa)}{(M_T/a)fK_1(fa) - \rho_f \omega^2 K_0(fa)}. \quad (4)$$

Thus only one unknown coefficient (A or B) needs to be determined from the boundary condition at the interface between the borehole and the TI formation. This leads to a dispersion equation for computing the Stoneley wave propagation in a fluid-filled borehole centered by a logging tool and surrounded by a TI formation.

$$D(k,\omega,c_{66},c_{44},M_T,R,\alpha,\rho,V_f,\rho_f,c_{11},c_{13},c_{33})=0. \quad (5)$$

The parameters in the above dispersion equation are ordered by their importance and relevance to the present problem. The functional form of the dispersion equation is given in the Appendix.

By solving the above dispersion equation in the frequency range of interest to find the root values of k for the Stoneley wave, as denoted by $k_{ST}$, the Stoneley-wave phase velocity (or slowness) dispersion curve is obtained:

$$V_{ST}(\omega)=\omega/k_{ST}, \text{ or } S_{ST}(\omega)=1/V_{ST}(\omega)=k_{ST}/\omega. \quad (6)$$

Figure 2A:
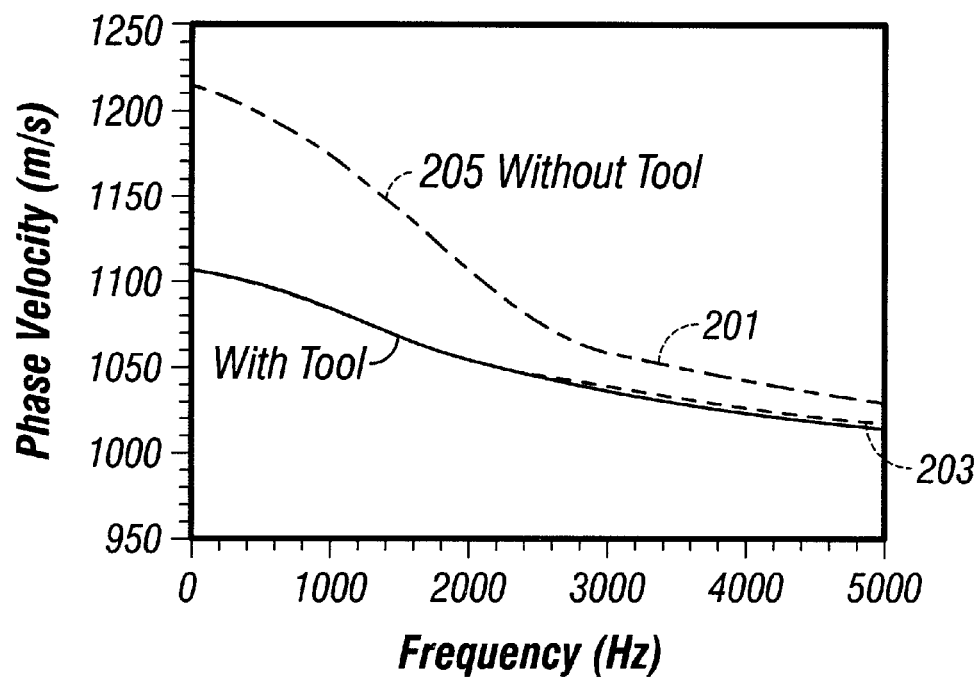
FIG. 2a Illustrates modeling the effect of the phase velocity of Stoneley waves in a formation, and the sensitivity of Stoneley wave modes due to a logging tool in a formation.

The validity of the simplified tool model is verified by comparing the modeling result with that of a cylindrically-shaped structure such as a cylindrical elastic shell model. The inner and outer radii of the shell are 0.035 m and 0.045 m, respectively. The shell's elastic parameters are E=48.8 GPa and v=0.25. The interior of the shell is filled with fluid (water). For this cylindrical shell tool model, the effective tool modulus in Equation (3) can be derived using a method given by Norris (1990) in the low-frequency limit.

$$M_T = \frac{2a^2/R^2}{\left(1-\frac{a^2}{R^2}\right)\left(\frac{1}{\rho_f V_{ST}^2(0)} - \frac{1}{\rho_f V_f^2}\right) - \frac{1}{c_{66}}}, \quad (7)$$

where $V_{ST}(0)$ is the zero-frequency limit of velocity for the Stoneley wave in the fluid annulus between borehole and the cylindrical shell. (Formation and borehole parameters are in Table I.) This gives a value of 6.73 GPa for $M_T$. With this $M_T$ value, the performance and accuracy of the approximate tool model can now be tested. The tool is now modeled by its effective modulus $M_T$ regardless of its internal structure. Considering the parameters involved even in this relatively simple tool model (i.e., the shell and fluid elastic constants and dimensions), the effective modulus model is truly a drastic simplification. Using the $M_T$ value in the dispersion relation given in Equation (5), one obtains the Stoneley wave phase velocity curve as a function of frequency. FIG. 2a shows the result of the approximate cylindrically-shaped structure model (dashed curve 201) compared with the exact result (solid curve 203) for the fluid-filled cylindrical shell model. The dispersion curve in the absence of the tool is also shown 205 Without Tool. There is an excellent agreement between the two results at low frequencies as may been seen when the 201 curve and 203 curve merge With Tool (especially below 2.5 kHz), with only small differences as frequency increases. These differences are only of academic importance because in practice they are well within the errors of field Stoneley wave measurements. The approximate model therefore provides simple but sufficiently accurate modeling for the effect of a logging tool on Stoneley wave propagation.

Figure 2B:
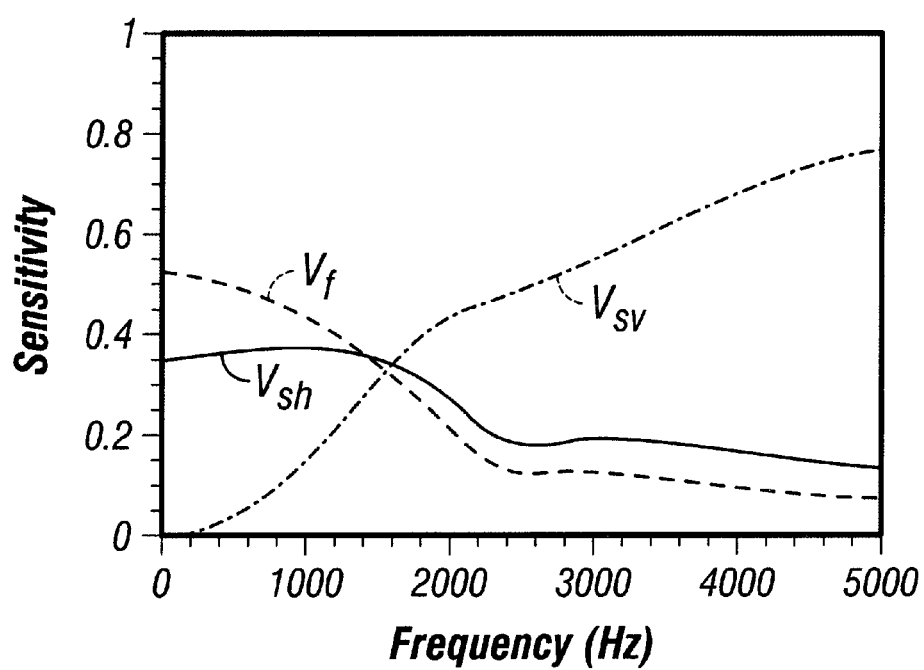
FIG. 2b Illustrates Stoneley wave sensitivities in a TI formation with a logging tool.

The need to incorporate the logging tool effect in the Stoneley wave propagation and inversion problem can now be demonstrated. As shown in FIG. 2a, the presence of the tool can substantially reduce the Stoneley wave velocity and changes the character of the wave dispersion curve. The presence of a tool can also significantly modify the wave's sensitivity to borehole fluid and formation elastic parameters. Using Equation (5), the Stoneley wave sensitivities of FIG. 1 for the TI formation are recalculated for the presence of the logging tool. (The tool is modeled by $\alpha$=0.045 m and $M_T$=6.73 GPa, as derived from the fluid-filled cylindrical shell model.) FIG. 2b shows the sensitivity analysis result. Compared with its respective counterpart in FIG. 1, the Stoneley wave sensitivity to the fluid and formation parameters is reduced by the presence of the tool. The sum of the three sensitivities is appreciably less than one, as can be easily seen by adding their zero-frequency values. The reduction of the sensitivity to borehole fluid is quite significant. This is understandable because the presence of the tool replaces a portion of the borehole fluid and the wave's sensitivity is now partitioned to the tool's compliance. Fortunately, the Stoneley wave sensitivity to $V_{sh}$ or $c_{66}$ is still quite significant in the low-frequency range (below 2 kHz in this case), which ensures the estimation of this parameter from Stoneley wave measurements. The analysis results shown in FIG. 2a and FIG. 2b demonstrates the necessity to incorporate the effects of logging tool in the analysis of field Stoneley wave data.

This section describes a simple and effective formulation to estimate the shear-wave TI parameter from borehole Stoneley waves using the dispersion Equation (5). The Stoneley waves acquired by an array acoustic tool are usually processed using array coherence stacking (e.g., semblance, Kimball and Marzetta, 1986) or waveform inversion (Tang, 1997) methods, yielding a Stoneley wave slowness profile over the logging depths. These methods are non-dispersive techniques that do not consider the dispersion effect in the waveform data. However, the Stoneley waves, as shown in FIG. 2a, can exhibit a quite significant dispersion effect in the low frequency range of interest. (In the following text, Stoneley wave slowness is used, instead of velocity, to conform to the convention used in acoustic logging.)

Fortunately, there exists a theoretical relationship between the wave's dispersion characteristics and the wave slowness derived from a non-dispersive processing technique. This relationship is given by $$\overline{S}_{ST} = \frac{\int_{-\infty}^{+\infty} S_{ST}(\omega, V_{sh})\omega^2 A^2(\omega) d\omega}{\int_{-\infty}^{+\infty} \omega^2 A^2(\omega) d\omega}, \quad (8)$$

where $\overline{S}_{ST}$ is the Stoneley-wave slowness, as obtained from the non-dispersive array processing; $S_{ST}(\omega, V_{sh})$ is the Stoneley-wave phase slowness dispersion curve, as computed from Equations (5) and (6). This dispersion curve is parameterized by the horizontal shear velocity $V_{sh}$ or $c_{66}$, assuming all other formation, borehole, and tool parameters, as needed to calculate Equation (5), are known; $A(\omega)$ is the Stoneley-wave amplitude spectrum. The integration in Equation (8) is over the entire wave spectrum covered by $A(\omega)$. The theoretical result given by Equation (8) can be called the Weighted Spectral Average Slowness theorem. The theorem states that the slowness resulting from a non-dispersive time-domain array processing method is a weighted spectral average of the wave's slowness dispersion curve over the frequency range of the wave spectrum. The weighting function is given by $\omega^2 A^2(\omega)$. Equation (8) is used to obtain an estimated Stoneley-wave slowness.

Figure 3C:
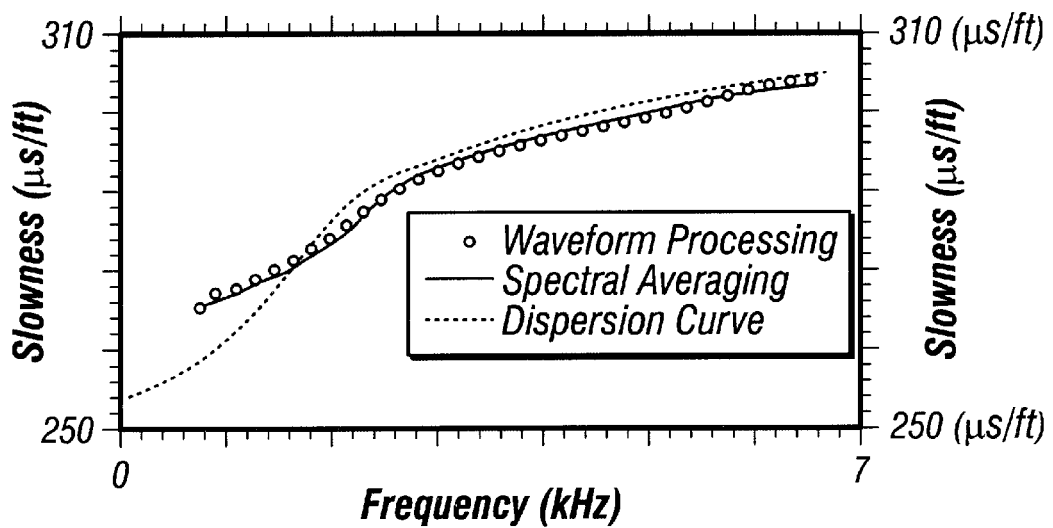
FIG. 3c Illustrates a comparison between the results of wave-form averaging and the results of spectral averaging to determine slowness values for Stoneley wave data.
Figure 3A:
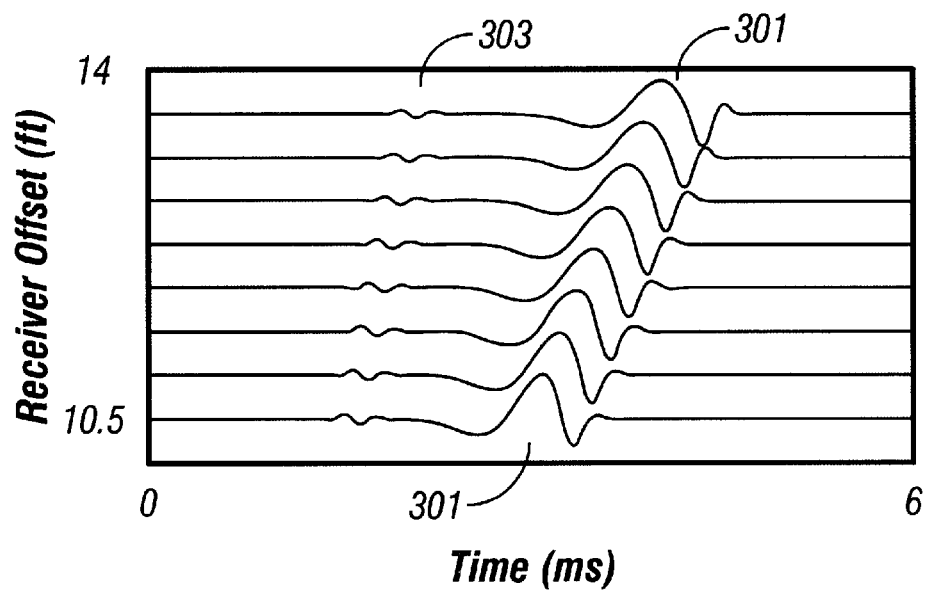
FIG. 3a Illustrates synthetic array Stoneley wave data.
Figure 3B:
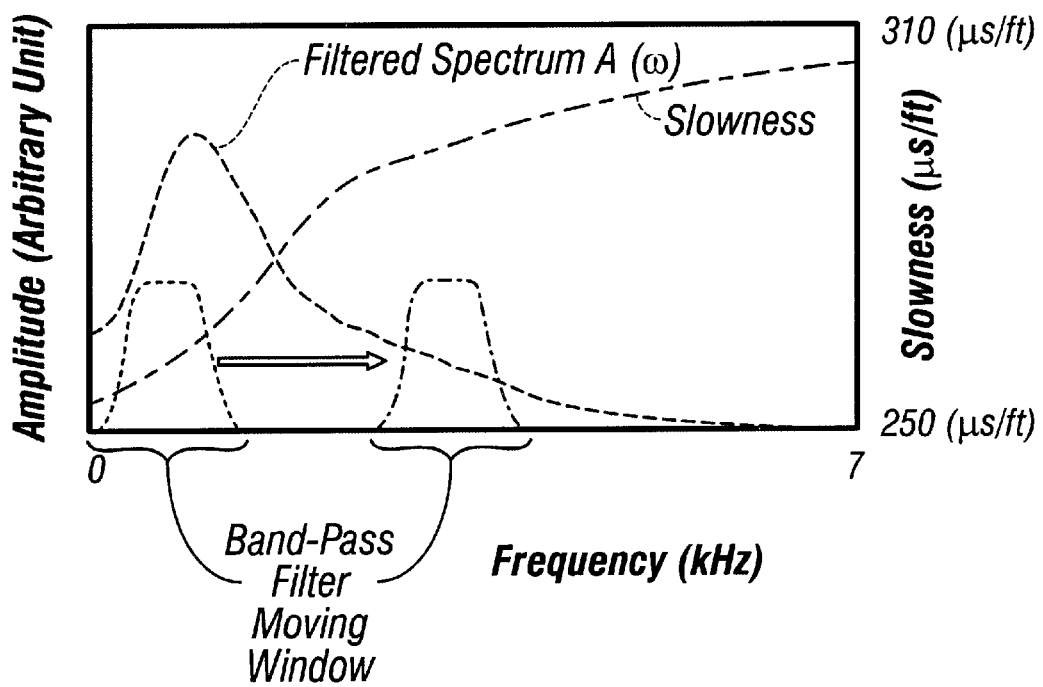
FIG. 3b Illustrates a wave spectrum and dispersion curve for Stoneley wave data.

An example of the weighted spectral average slowness theorem uses a numerical example to demonstrate the validity of the important result in Equation (8). Although this result was obtained from studying the dispersion effect of dipole-flexural waves, we use a synthetic Stoneley wave data set to demonstrate the general applicability of this result to dispersive waves. FIG. 3a shows an array of synthetic Stoneley waves 301 for the slow TI formation listed in Table I. The waveforms also contain a high-frequency P-wave 303 whose frequency content is outside the frequency range of interest. FIG. 3b shows the corresponding wave amplitude spectrum, Filtered spectrum $A(\omega)$, and the wave slowness dispersion curve, slowness. Both the waveform and dispersion curve show that the wave is quite dispersive toward the low frequency range, which is needed to test the theoretical result in Equation (8). As illustrated in FIG. 3b, a band-pass filter of 1.5 kHz width, Band-pass filter moving window, is used to pass the wave frequency components within the frequency window specified by the filter. The filtered wave data are then processed using the predictive waveform inversion method (Tang 1997) to yield a wave slowness value for $\overline{S}_{ST}$. This slowness is then assigned to the frequency at the center of the frequency window for the band-pass filter. In the frequency domain, the amplitude spectrum of the filter is multiplied with that of the Stoneley wave, as shown in the same figure, to form the filtered wave amplitude spectrum $A(\omega)$. The wave spectrum is then used in Equation (8) to weight the wave dispersion curve and produce a weighted slowness value. These calculations are repeated for a range of the filter center frequency from 0.75 to 6 kHz, at an increment of 0.2 kHz. FIG. 3c shows the comparison of the waveform-processed slowness (open circles Waveform Processing) and the weighted spectral average slowness (solid curve Spectral Averaging) values, together with the wave's dispersion curve (dashed curve Dispersion Curve). As predicted by the theory represented by Equation (8), the waveform-processed slowness (Waveform Processing) does not fall onto the wave's phase dispersion curve (Dispersion Curve). Instead, it agrees excellently with the weighted spectral average slowness value (Spectral Averaging) given by Equation (8). This numerical example gives a proof of the theoretical relationship given in Equation (8) for the Stoneley wave case.

Equation (8) can be used to provide a simple and effective estimation for the horizontal shear velocity $V_{sh}$ or $c_{66}$ from the Stoneley-wave logging data. As the equation shows, the Stoneley-wave slowness, as derived by a non-dispersive array processing method (semblance or waveform inversion), is related to the wave's phase dispersion curve over the frequency range occupied by the wave's spectrum. Equation (8) contains only one unknown parameter, $V_{sh}$ or $c_{66}$. All other parameters, as needed to calculate the dispersion Equation (5), are assumed known or available from log data. For example, $c_{44}$, $c_{33}$, $\rho$, and R are available from conventional dipole shear-wave slowness, monopole P-wave slowness, density, and caliper logs. The borehole fluid parameters $\rho_f$ and $V_f$ can be estimated from the type of borehole fluid used. The TI parameters $c_{11}$ and $c_{13}$ can be treated as follows. The difference between $c_{11}$ and $c_{33}$ defines the P-wave TI parameter $\epsilon$ (Thomsen, 1986), which is generally correlated with the shear-wave TI parameter $\gamma$. Assuming that $\epsilon$ and $\gamma$ are about the same order gives $c_{11}=c_{33}(c_{66}/c_{44})$. We also assume $c_{13}=c_{33}-2c_{44}$. These treatments, although approximate, will not significantly alter the estimation for $V_{sh}$ or $c_{66}$, because the Stoneley wave is relatively insensitive to the parameters $c_{11}$, $c_{13}$, and $c_{33}$. The tool radius a is always available and the tool's effective modulus can be obtained from a calibration procedure to be described later.

By specifying all necessary parameters in the dispersion Equation (5), the shear-wave TI parameter, $V_{sh}$ or $c_{66}$, can be estimated using Equation (8) by the following procedure:

Step 1: Process array Stoneley wave data to obtain $\overline{S}_{ST}$, the measured Stoneley-wave slowness.

Step 2: Compute the Stoneley wave spectrum $A(\omega)$. Integrate $\omega^2 A^2(\omega)$ over the frequency range of $A(\omega)$ to obtain the denominator of Equation (8).

Step 3: For a selected horizontal shear velocity $V_{sh}$, calculate the dispersion curve $S_{ST}(\omega, V_{sh})$ using Equations (5) and (6) including an effective tool modulus $M_T$.

Step 4: Weight $S_{ST}(\omega, V_{sh})$ with the weighting function $\omega^2 A^2(\omega)$ and integrate the weighted slowness curve over the frequency range of $A(\omega)$. Divide the integral value with the denominator value from step 2 to obtain an estimated Stoneley-wave slowness, then equate the result to the measured Stoneley-wave slowness $\overline{S}_{ST}$ determined from the acquired data of Step 1.

Step 5: Repeat steps 3 and 4 for selected values of $V_{sh}$ until Equation (8) is satisfied; that is, until an acceptable difference between the measured and estimated values for $\overline{S}_{ST}$ are achieved. Output $V_{sh}$ as the formation horizontal shear-wave velocity when the difference is acceptable.

Repeating the above procedure for the logging depth range of interest yields a continuous formation horizontal shear-wave velocity (or slowness) profile. The vertical shear velocity (or slowness) profile may be obtained from standard logging techniques. With the vertical and horizontal shear velocity (slowness) profiles, a continuous profile of the shear-wave TI parameter, commonly known as the Thomsen parameter γ (Thomsen, 1986), can be calculated, as $$\gamma = \frac{c_{66} - c_{44}}{2c_{44}} \approx 2\frac{V_{sh} - V_{sv}}{V_{sv} + V_{sh}}. \quad (9)$$

The anisotropy profile can then be used to assess the degree of formation anisotropy for seismic and/or formation evaluation applications.

Figure 4:
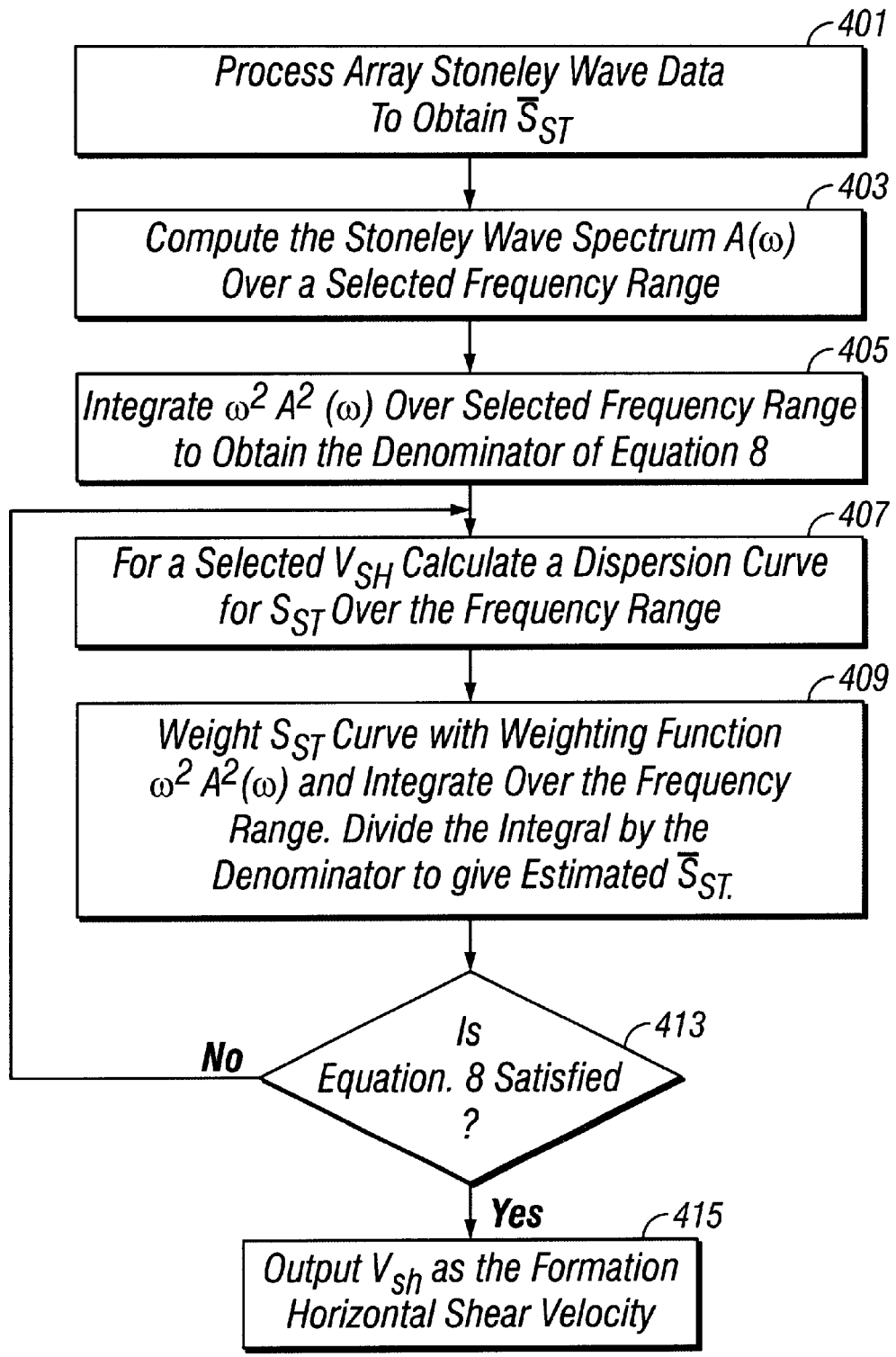
FIG. 4 Illustrates a flow chart for determining a formation horizontal shear velocity.

Deriving a formation horizontal shear-wave velocity profile is further illustrated by referring to the flow chart of FIG. 4. Array Stoneley wave data are processed 401 to obtain $\overline{S}_{ST}$. For example, standard non-dispersive predictive waveform inversion techniques may be used. The Stoneley wave spectrum A(ω) is computed 403 over a selected frequency range. For example, the frequencies in the range of from 0.75 Hz to 6 Hz has been found to be acceptable. For use as a denominator in the calculation of Equation (8), $\omega^2 A^2(\omega)$ is integrated 405 over the selected frequency range. For a selected horizontal shear wave velocity, $V_{sh}$, a dispersion curve for $S_{ST}(\omega, V_{sh})$ over the frequency range is determined 407, using, for example, the bandpass method commonly known in signal processing, and processing with the predictive waveform inversion method. A range for values for selecting the horizontal shear wave velocity, $V_{sh}$, is well known by practitioners in the art and may be preselected. The dispersion curve $S_{ST}(\omega, V_{sh})$ is then weighted with the weighting function $\omega^2 A^2(\omega)$ and integrated 409 over the frequency range of A(ω). This integration is then divided by the previously determined denominator to produce an estimated $\overline{S}_{ST}$, an estimate which is based on the calculation of Equation (8). This estimated $\overline{S}_{ST}$ is then compared 413 to the originally acquired array Stoneley-wave slowness data $\overline{S}_{ST}$ of 401. When the difference between the estimated Stoneley wave slowness data $\overline{S}_{ST}$ of 409 and the acquired array Stoneley wave slowness data $\overline{S}_{ST}$ of 401 is at or within a selected minimum difference, the selected $V_{sh}$ value may be output 415 as the formation horizontal shear velocity from the selected range of values of $V_{sh}$. Many standard techniques are available for determining whether the differences determined in step 413 are acceptable.

As shown in the previous modeling example (FIG. 2a and FIG. 2b), the compliance of the tool can have an important influence on the Stoneley-wave propagation characteristics. A calibration procedure is used to determine the tool compliance, which is specified by the effective modulus $M_T$. For a formation interval of known anisotropy (e.g., zero anisotropy), the same form of equation as Equation (8) is used to determine the tool modulus $M_T$. For example, for a formation without anisotropy, the formation parameters ($V_p$, $V_s$, and ρ) needed to calculate the dispersion Equation (5) are available from log data, and the fluid parameters ($V_f$ and $\rho_f$) can be estimated from the borehole fluid used. The only unknown parameter is the tool modulus $M_T$. The calibration procedure is essentially adjusting the value of $M_T$ in the dispersion equation, in a manner analogous to the method for horizontal shear determination of equation (8), until the following equation is satisfied (e.g., the difference between the measured $\overline{S}_{ST}$ and estimated $\overline{S}_{ST}$ reaches an acceptable minimum.

$$\overline{S}_{ST} = \frac{\int_{-\infty}^{+\infty} S_{ST}(\omega, M_T)\omega^2 A^2(\omega)d\omega}{\int_{-\infty}^{+\infty} \omega^2 A^2(\omega)d\omega}. \quad (10)$$

Once the tool modulus is specified from calibration, it is used in the dispersion Equation (5) to calculate the Stoneley wave dispersion for the inversion processing to determine formation horizontal shear-wave velocity or slowness.

Figure 5:
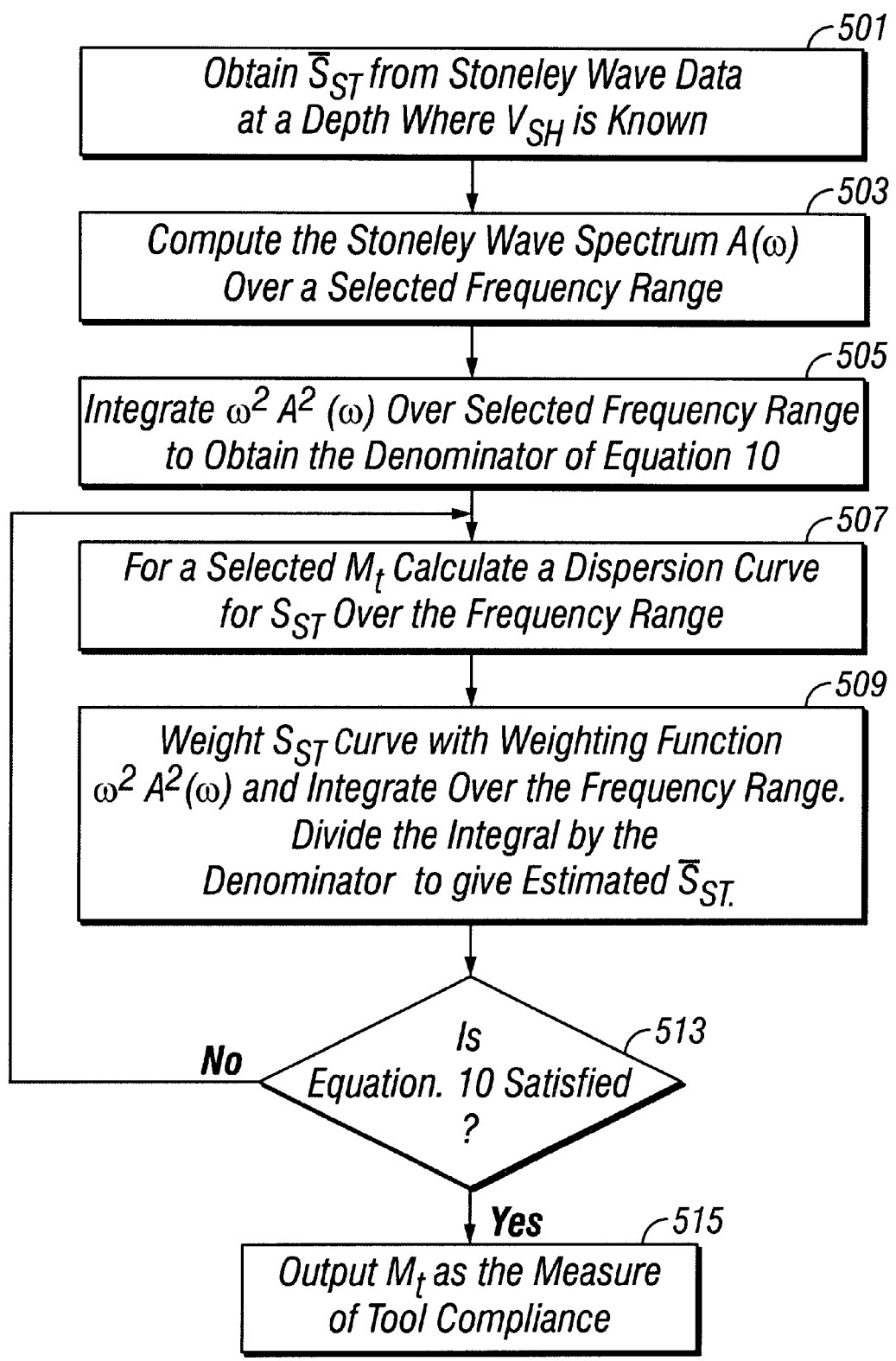
FIG. 5 Illustrates a flow chart for determining a logging tool compliance value, the tool effective modulus.

The method for calibrating the compliance of the logging tool, the tool modulus $M_T$, is illustrated in the flow chart of FIG. 5. Array Stoneley wave data are processed 501 to obtain measured Stonelely-wave slowness, $\overline{S}_{ST}$, at a depth where horizontal shear-wave velocity, $V_{sh}$, is known and/or $V_{sh}=V_{sv}$. For example, standard non-dispersive predictive waveform inversion techniques may be used. The Stoneley wave spectrum A(ω) is computed 503 over a selected frequency range. For example, the frequency range of from 0.25 to 3 kHz has been found to be acceptable. For use as a denominator in the calculation of Equation (10), $\omega^2 A^2(\omega)$ is integrated 505 over the selected frequency range. A dispersion curve for $S_{ST}(\omega, M_T)$ over the frequency range A(ω) is determined 507, using, for example, the bandpass method previously disclosed, and processing with the predictive waveform inversion method. The dispersion curve $S_{ST}(\omega, M_T)$ is then weighted with the weighting function $\omega^2 A^2(\omega)$ and integrated 509 over the frequency range of A(ω). This integration is then divided by the previously determined denominator to produce an estimated $\overline{S}_{ST}$, an estimate which is based on the calculation of Equation (10). This estimated $\overline{S}_{ST}$ is then compared 513 to the originally acquired array Stoneley wave data $\overline{S}_{ST}$ of 501. When the difference between the estimated slowness $\overline{S}_{ST}$ of 509 and the measured slowness, $\overline{S}_{ST}$, from the acquired array Stoneley wave data of 501 is at or within a selected minimum difference, the value of $M_T$ used may be output 515 as the tool modulus $M_T$. Many standard techniques, well known to practitioners of the art, are available for determining whether the differences determined in step 513 are acceptable.

Figure 6A:
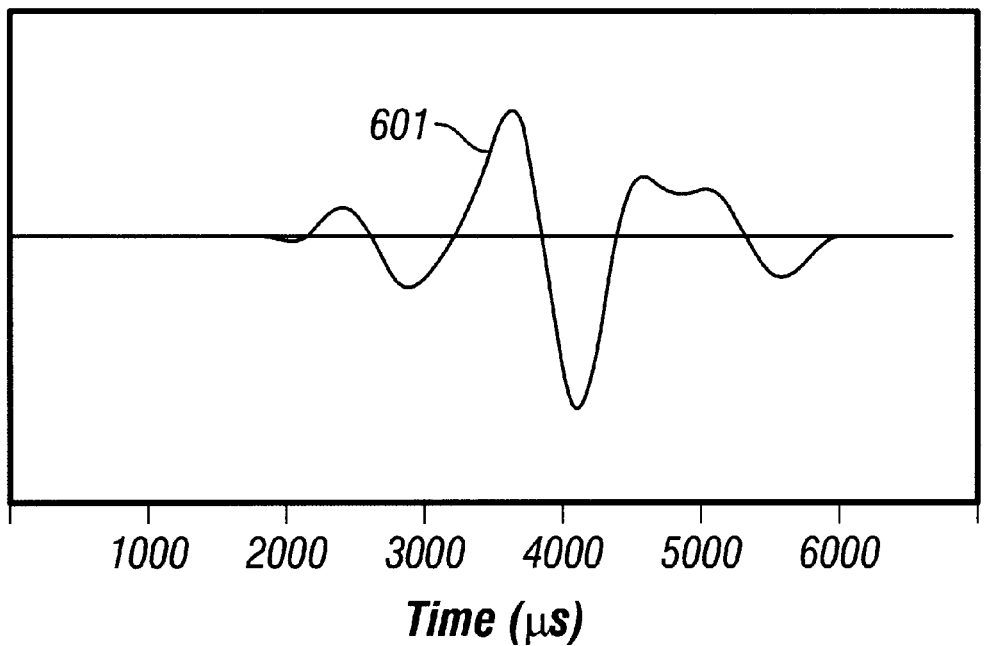
FIG. 6a Illustrates a Stoneley wave waveform.
Figure 6B:
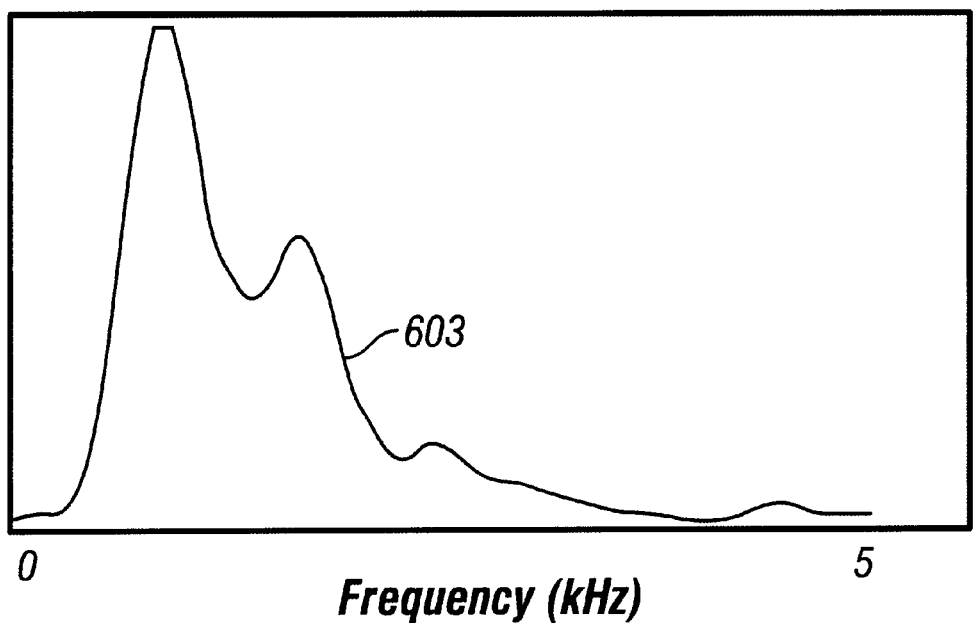
FIG. 6b Illustrates a Stoneley wave amplitude spectrum.

The method of this invention has been applied to an acoustic logging data set from a well near Braggs, Wyo. The well was drilled through the Lewis shale formation. The goal was to characterize the TI property of the Lewis shale formation in this area. Acoustic dipole and monopole waveform logging data were acquired throughout the formation. The low-frequency end of the monopole data was set to 0.2 kHz to allow for the acquisition of Stoneley waves in the waveform data. FIG. 6a shows an example of the Stoneley waveform 601 at a depth in the Lewis shape formation (only receiver 1 waveform from an eight-receiver array is shown). The Stoneley wave frequency band as shown in FIG. 6b is 0.2–4 kHz, with a peak frequency shown in the amplitude spectrum 603 at about 1 kHz. As suggested by the theoretical analyses of FIG. 1 and FIG. 2b, the frequency range below 2 kHz is ideal for the shear-wave TI estimation, because the Stoneley-wave sensitivity to the TI parameter is most significant in the low-frequency range.

Figure 7A:
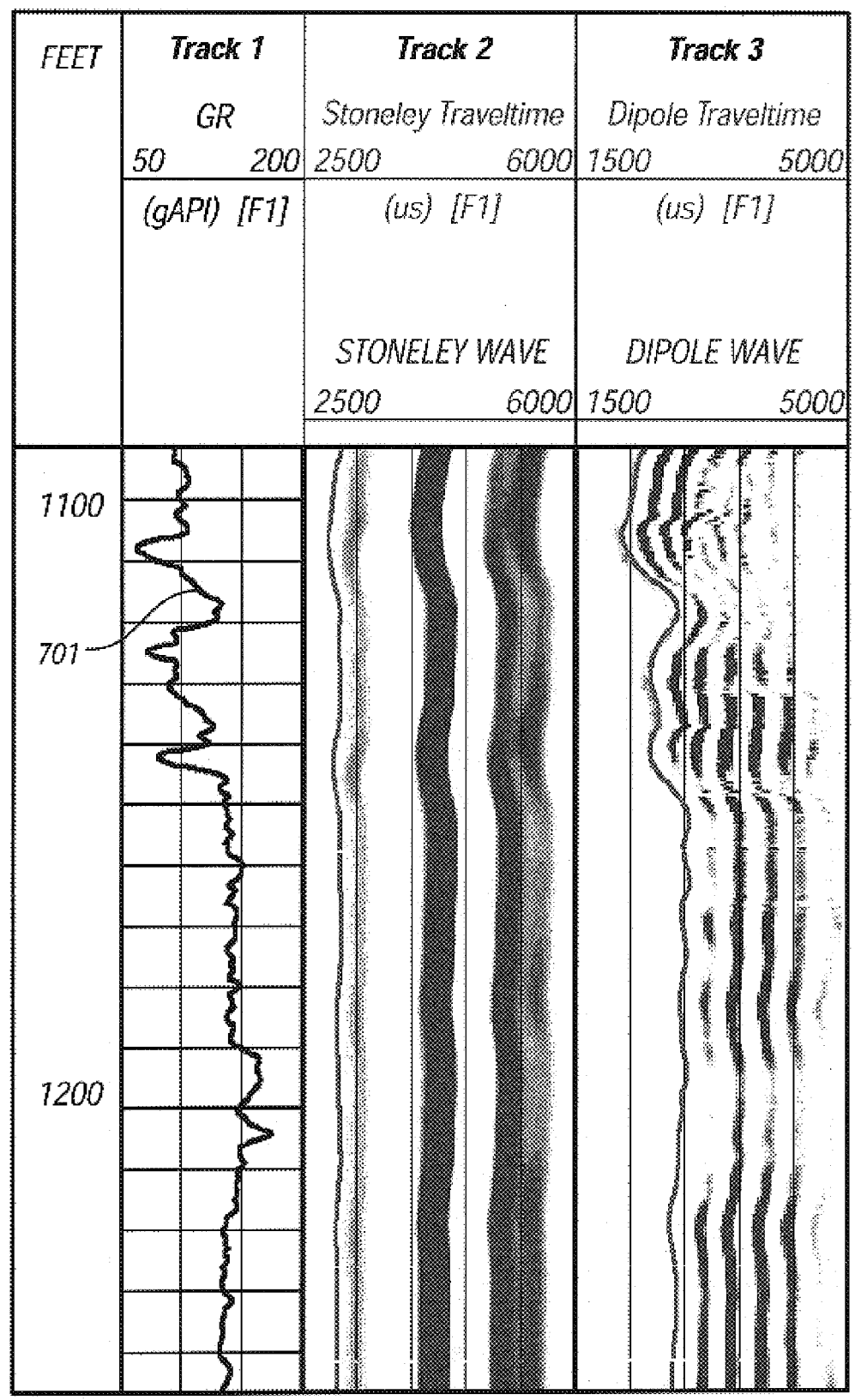
FIG. 7 Illustrates a well log of Stoneley wave TI anisotropy results in an earth formation.
Figure 7B:
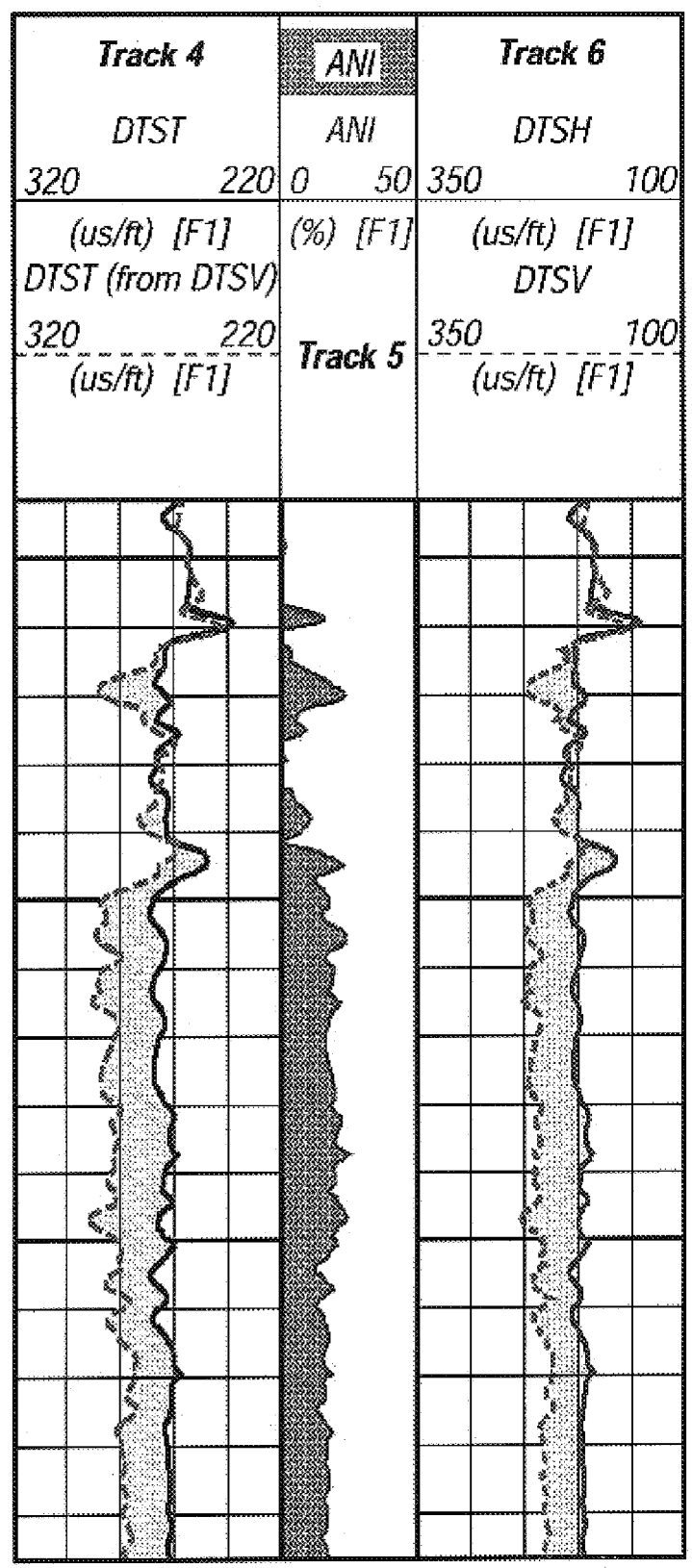

FIG. 7 shows the detailed analysis results for the transition zone at the top of the Lewis shale formation. Adjacent to the Lewis shale, the formation is characterized by shaly sandstone and sand/shale sequences. Track 1 of the figure shows the gamma ray curve. The high gamma ray value (>120 gAPI, arrow at 701 in Track 1) marks the beginning of the massive Lewis shale formation. Track 2 and Track 3 show, respectively, the Stoneley- and dipole-wave data (plotted using a variable density display, only receiver 1 of an eight-receiver array is shown). Processing the Stoneley and dipole wave data yields the Stoneley wave slowness in Track 4 (solid curve labeled 'DTST') and the shear slowness in Track 6 (dashed curve labeled 'DTSV', standing for slowness of vertically propagating shear wave). As a quality-control check for the slowness curves, the curves are integrated over the transmitter to receiver I distance to give the respective travel time curves for the Stoneley wave (Track 2) and dipole-shear wave (Track 3). The travel time curves track the respective waveform quite well, indicating the validity of the slowness results.

An interesting feature is that the travel-time curve (or waveform) for the dipole data shows more character/variation than that of the Stoneley data. Relative to the Stoneley wave, the dipole-shear wave is much delayed in the shale formation compared to the formation above it. Because the Stoneley- and dipole-waves in a TI formation are controlled, respectively, by $V_{sh}$ (DTSH) and $V_{sv}$(DTSV) (Ellefsen, 1990), this waveform/travel-time character/delay difference between the two type of waves reveals the difference between the two shear-wave velocities, providing an direct indication of the TI effect for the formation of interest. The dipole shear slowness (DTSV in Track 6) and the Stoneley wave slowness (DTST in Track 4) are utilized in Equation (8) to determine the horizontal shear slowness DTSH.

The borehole fluid is a water-based mud with $V_f$=1524 m/s (5000 ft/s) and $\rho_f$=1.2 g/cm$^3$. The shaly sandstone interval around 1100' is chosen as the calibration depth to determined the tool modulus using Equation (10). The estimated horizontal shear slowness profile is shown in Track 6 (solid curve labeled 'DTSH'). This shear slowness profile shows a substantial difference (shaded area between DTSH and DTSV) compared with the vertical shear slowness DTSV. The two slowness curves are then used in Equation (9) to calculate the shear-wave TI anisotropy parameter γ. The γ profile is shown as the shaded curve in Track 5, scaled from 0 to 50%. The anisotropy shows a massive, continuous feature below the top of the Lewis shale formation, but tends to vanish in the shaly-sand interval and sandstone streaks above the formation.

The anisotropy effect can also be analyzed by comparing the measured Stoneley slowness having the TI effects with a computed slowness without the TI effects. Assuming isotropy for the formation, the vertical shear slowness curve (DTSV in Track 6) can be used to compute an isotropic Stoneley-wave dispersion curve, which, after the weighted-averaging process using Equation (8), gives the (isotropic) Stoneley slowness in Track 4 (dashed curve labeled 'DTST (from DTSV)'). The difference between the measured and computed (isotropic) Stoneley-wave slowness curves (shaded area between the two curves) also indicates the presence of anisotropy. In fact, the Stoneley wave slowness curves in Track 4 can be regarded as the mapping/transformation, using Equations (5) and (8), of the shear wave slowness curves in Track 6 for the isotropic and anisotropic (TI) cases.

Figure 8A:
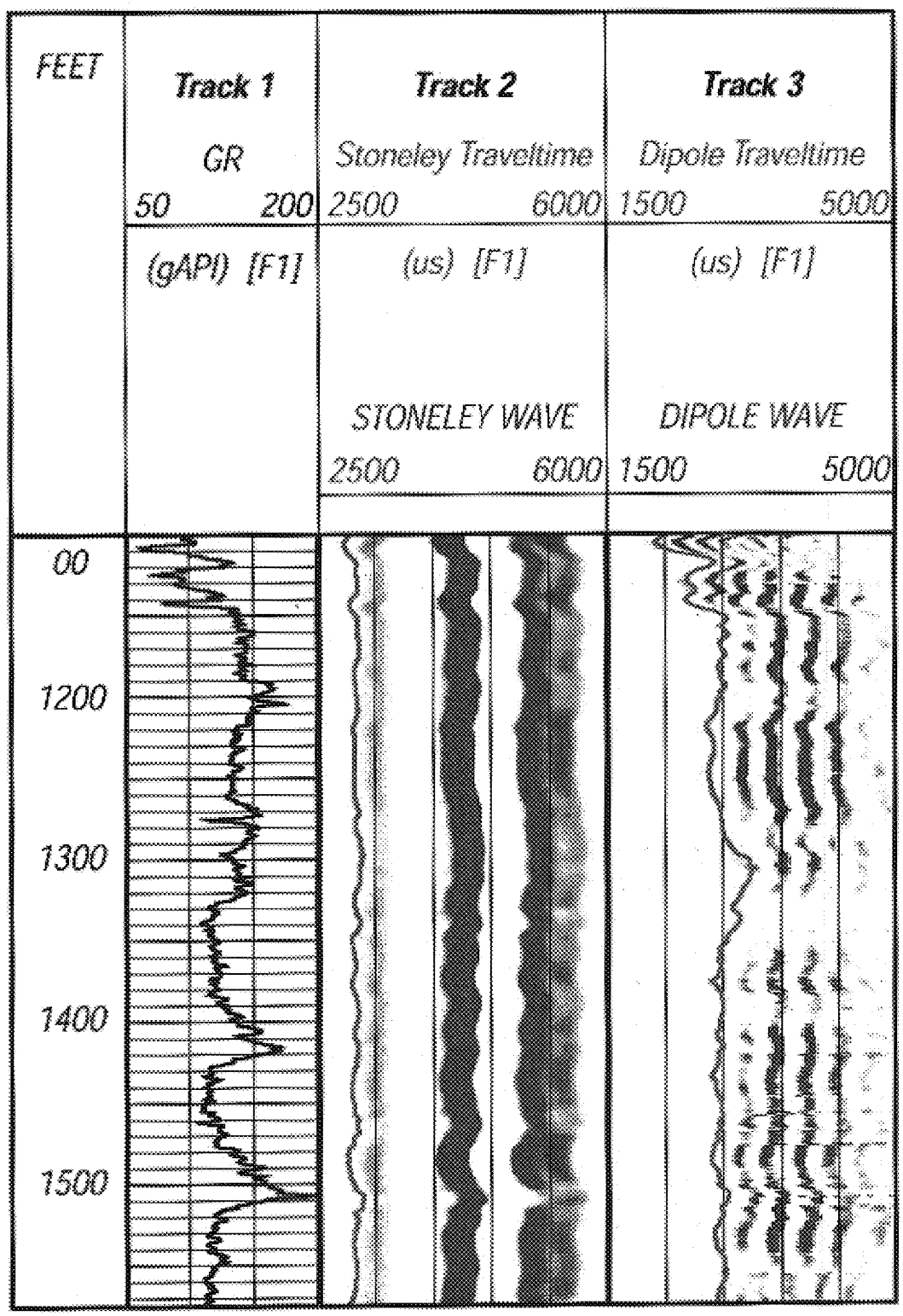
FIG. 8 Illustrates a well log of Stoneley wave TI anisotropy results in an earth formation.
Figure 8B:
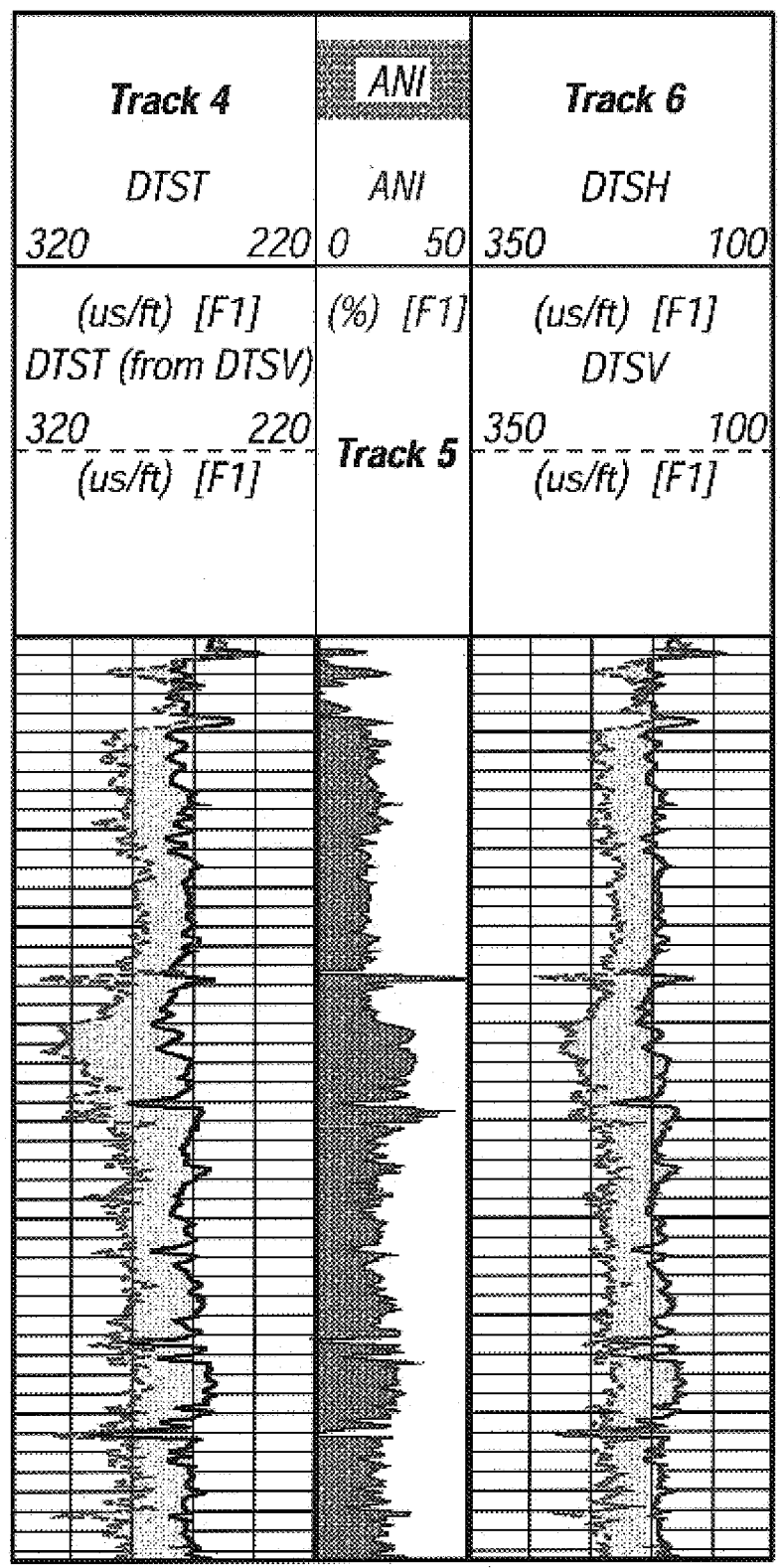

FIG. 8 is the continuation of FIG. 7 into the main body of the Lewis shale formation. The data display and scales are the same as FIG. 7. Notice that a substantial (TI) anisotropy is observed throughout this formation except some thin streaks. The anisotropy is quite significant, generally on the order of 20–30%. A prominent feature can be seen in a depth zone below 1300', where the dipole wave Track 3 shows a significant delay while the corresponding response on the Stoneley wave Track 2 is minimal. This feature corresponds to the significant increase in the difference between the two slowness curves in Track 4 and Track 6, and the increase of anisotropy in Track 5. The anisotropy exceeds 30% between 1300' and 1350'. The anisotropy estimation from the Stoneley log data delineates the shear-wave (TI) anisotropy magnitude and variation of the Lewis shale formation.

In the absence of formation anisotropy (TI), the above procedure can also be used to estimate the formation shear-wave velocity (slowness) from Stoneley-wave logging data. In this case, the formation has only two elastic parameters: P- and shear-wave velocities. The former is available from logging and the latter can be estimated from the above procedure. Deriving shear-wave slowness from Stoneley waves logged in slow formations was a common practice before the inception of dipole acoustic logging. However, most calculations either ignored the presence of a tool, or used inappropriate tool models (rigid or having a low impedance). With the effective elastic modulus model and the effective estimation method as described in this study, the accuracy and reliability of the shear-wave velocity estimation can be enhanced.

As in the shear slowness analysis using Stoneley waves, the Stoneley wave method is applicable mostly in slow formations where the formation shear rigidity is comparable or below the borehole fluid modulus. In this case the Stoneley wave is quite sensitive to formation shear wave properties, isotropic or anisotropic. However, in fast formations, the sensitivity diminishes (Ellefsen, 1990) and the estimation will suffer large errors or become invalid. Additionally, formation permeability is known to significantly affect the Stoneley wave propagation velocity, especially at low frequencies (Tang et al., 1991). Thus the TI parameter estimation method using low-frequency Stoneley waves may be less effective in highly permeable formations unless the permeability effect can be accounted for.

The Stoneley-wave estimation method of this invention obtains only the shear-wave anisotropy information. However, in seismic migration/imaging using P- and/or converted waves, the P-wave anisotropy parameter ε (Thomsen, 1986) is desired. Fortunately, in many rocks, such as shales, P-wave anisotropy and shear-wave anisotropy are strongly correlated (Thomsen, 1986). In this case, the shear-wave anisotropy can be correlated with the P-wave anisotropy data to delineate the magnitude and variation of the P-wave anisotropy. In this regard, the obtained shear-wave anisotropy provides important information for seismic migration/imaging.

In summary, Stoneley waves acquired in a borehole penetrating a transversely isotropic (TI) formation can be utilized to quantify the shear-wave TI property, yielding a continuous TI-parameter profile of the formation. In the TI-parameter estimation, the effect of a logging tool needs to be considered, as the presence of the tool can significantly modify the Stoneley-wave sensitivity to the formation shear-wave property. For low-frequency Stoneley waves, the effect of the tool can be satisfactorily and accurately modeled using an effective tool modulus, which can be determined using a calibration procedure. The Stoneley wave slowness, as obtained from a non-dispersive array processing techniques, is the weighted average of the Stoneley-wave dispersion curve over the frequency range of the wave spectrum. By relating the Stoneley slowness to the Stoneley dispersion curve computed using the formation TI parameter, a fast inversion method is developed to estimate the TI parameter. Application of the method to the Stoneley wave data from the Lewis shale formation in Braggs, Wyo., yields a continuous shear-wave (TI) anisotropy profile of the formation. This shale formation has high anisotropy values on the order of 20–30%.

Appendix: Stoneley-wave Dispersion Equation for a Fluid-filled Borehole Centered by a Logging Tool and Surrounded by a TI Formation This Appendix extends the work of Tongtaow (1982) and Ellefsen (1990) for a monopole-wave propagation in a fluid-filled borehole with a TI formation to incorporate the presence of a compliant logging tool. In a TI solid, elastic waves can no longer be generally resolved into independent compressional (P) and shear waves, as in the isotropic case. Instead, the waves are designated as "quasi-P" ("quasi-S") to describe the small coupling of the P (shear) wave vibration to the shear (P) wave. There is also another shear wave involving transverse motion confined to the horizontal plane, the SH shear wave. In the acoustic logging problem, the elastic waves in the TI formation are coupled with the acoustic wave motion in the borehole fluid. The solutions for the borehole fluid displacement u and pressure p have already been given in Equations (2). At the borehole interface, the borehole fluid conductance u/p must match that of the (TI) formation, as $$\left(\frac{u}{p}\right)_{r=R} = \left(\frac{u_r}{-\sigma_{rr}}\right)_{r=R} \tag{A-1}$$

where $u_r$ and $\sigma_{rr}$ are the radial displacement and stress of the TI solid, respectively. The shear stress $\sigma_{rz}$ of the TI solid must vanish at the borehole interface.

$$\sigma_{rz}=0, \text{ (at } r=R\text{).} \tag{A-2}$$

The solutions for $u_r$, $\sigma_{rr}$, and $\sigma_{rz}$ have been given by Tongtaow (1982) and Ellefsen (1990). Using these solutions and Equations (3), (A-1), and (A-2), a monopole-wave dispersion equation is derived, as given by:

$$D(k,\omega) = \det\begin{pmatrix} TI_{11} & TI_{12} & TI_{13} \\ TI_{21} & TI_{22} & TI_{23} \\ TI_{31} & TI_{32} & TI_{33} \end{pmatrix} = 0 \tag{A-3}$$

where det denotes taking the determinant of the matrix ($TI_{ij}$) for the TI formation, whose elements are given by:

$$\begin{cases} TI_{11} = f[I_1(fR) - E_{tool}K_1(fR)] \\ TI_{12} = -q_p(1+ika')K_1(q_pR) \\ TI_{13} = -q_s(b'+ik)K_1(q_sR) \\ TI_{21} = -\rho_f\omega^2[I_0(fR) + E_{tool}K_0(fR)] \\ TI_{22} = [c_{11}q_p^2 - c_{13}k^2 + (c_{11}-c_{13})ika'q_p^2]K_0(q_pR) + \frac{2q_pc_{66}}{R}(1+ika')K_1(q_pR) \\ TI_{23} = [(c_{11}q_s^2 - c_{13}k^2)b' + (c_{11}-c_{13})ikq_s^2]K_0(q_sR) + \frac{2q_sc_{66}}{R}(b'+ik)K_1(q_sR) \\ TI_{31} = 0 \\ TI_{32} = c_{44}[a'(k^2+q_p^2) - 2ik]q_pK_1(q_pR) \\ TI_{33} = c_{44}[(k^2+q_s^2) - 2ikb']q_sK_1(q_sR) \end{cases} \tag{A-4}$$

where $I_n$ and $K_n$ (n=0,1) denote the first and second kind modified Bessel functions of the nth order, respectively. The radial wavenumbers for the borehole fluid, formation quasi-P and quasi-S waves are given by:

$$f = \left(k^2 - \frac{\omega^2}{V_f^2}\right)^{\frac{1}{2}}; \quad q_p = \omega\sqrt{\frac{-B+\sqrt{B^2-4AC}}{2A}}; \tag{A-5}$$

$$q_s = \omega\sqrt{\frac{-B-\sqrt{B^2-4AC}}{2A}}$$

with the symbols A, B, and C given by $$\begin{cases} A = c_{11}c_{44} \\ B = \rho(c_{11}+c_{44}) - (c_{11}c_{33} - c_{13}^2 - 2c_{13}c_{44})(k^2/\omega^2) \\ C = c_{33}c_{44}(\rho/c_{44} - k^2/\omega^2)(\rho/c_{33} - k^2/\omega^2) \end{cases} \tag{A-6}$$

The shear coupling to the quasi-P wave, $a'$, and the compressional coupling to the quasi-S wave, $b'$, coefficients, as appear in Equations (A-4), are given by $$a' = -\frac{1}{ik}\frac{(c_{13}+2c_{44})k^2 - c_{11}q_p^2 - \rho\omega^2}{c_{44}k^2 - (c_{11}-c_{13}-c_{44})q_p^2 - \rho\omega^2}, \tag{A-7}$$

$$b' = -ik\frac{c_{44}k^2 - (c_{11}-c_{13}-c_{44})q_s^2 - \rho\omega^2}{(c_{13}+2c_{44})k^2 - c_{11}q_s^2 - \rho\omega^2}.$$

Of particular importance for this study is the coefficient, $E_{tool}$, as appears in $TI_{11}$ and $TI_{21}$ of Equations (A-4), which models the effect of a compliant acoustic logging tool on the wave propagation. This coefficient is given in Equation (4), and is rewritten here for discussions.

$$E_{tool} = \frac{(M_T/a)fI_1(fa) + \rho_f\omega^2 I_0(fa)}{(M_T/a)fK_1(fa) - \rho_f\omega^2 K_0(fa)}. \tag{A-8}$$

Two special cases can be derived from the above expression. The first is the fluid-filled borehole without tool. This is case is derived by setting the tool radius a to zero, leading to $E_{tool}=0$. Equation (A-4) then reduces the result of Ellefsen (1990). The second case is the rigid tool case studied by Tang and Cheng (1993). This case is modeled by letting $M_T \to \infty$, resulting in $E_{tool}=I_1(f\alpha)/K_1(f\alpha)$, in agreement with Tang and Cheng (1993).

By setting the determinant in Equation (A-3) to zero, the resulting equation is called the dispersion equation. The wavenumbers, k, satisfying the dispersion equation are found numerically for each given angular frequency $\omega$.

What is claimed is:

1. A method of using an acoustic logging tool conveyed in a borehole in a formation for determining a characteristic of the formation, said logging tool having at least one source and a plurality of receivers, the method comprising:

(a) obtaining an effective tool modulus of said logging tool;

(b) measuring a Stoneley-wave slowness from array Stoneley-wave data; and, (c) calculating a horizontal formation shear wave velocity, $V_{sh}$, as a function of said measured Stoneley-wave slowness and an estimated Stoneley-wave slowness, said estimated Stoneley-wave slowness computed using said effective tool modulus of said logging tool.

2. The method according to claim 1 further comprising calculating a transverse isotropy for said formation as a function of said calculated horizontal shear wave velocity $V_{sh}$ and a vertical shear wave velocity $V_{sv}$.

3. The method according to claim 2 wherein a formation shear-wave transverse isotropy parameter, $\gamma$, is calculated as $$\gamma = \frac{c_{66} - c_{44}}{2c_{44}} \approx 2\frac{V_{sh} - V_{sv}}{V_{sv} + V_{sh}}.$$

4. The method according to claim 1 wherein calculating said horizontal formation shear velocity, $V_{sh}$, further comprises minimizing a difference between said Stoneley-wave slowness and an estimated Stoneley-wave slowness computed from a calculation of the form $$\overline{S}_{ST} = \frac{\int_{-\infty}^{+\infty} S_{ST}(\omega, V_{sh})\omega^2 A^2(\omega)d\omega}{\int_{-\infty}^{+\infty} \omega^2 A^2(\omega)d\omega}$$

for selected values of $V_{sh}$.

5. The method according to claim 1 wherein obtaining said effective tool modulus of said logging tool further comprises modeling said logging tool as a cylindrically-shaped structure.

6. The method according to claim 1 wherein obtaining said effective tool modulus of said logging tool further comprises:

i) measuring a Stoneley-wave slowness from array Stoneley-wave data in a formation where a horizontal shear wave velocity is known; and ii) calculating an effective logging tool modulus for said logging tool wherein said logging tool modulus is calculated as a function of said measured Stoneley-wave slowness and an estimated Stoneley-wave slowness, said estimated Stoneley-wave slowness computed using said known horizontal shear wave velocity.

7. The method according to claim 6 wherein calculating said effective tool modulus further comprises minimizing a difference between said Stoneley-wave slowness and said estimated Stoneley-wave slowness computed using said known horizontal shear wave velocity from $$\overline{S}_{ST} = \frac{\int_{-\infty}^{+\infty} S_{ST}(\omega, M_T)\omega^2 A^2(\omega)d\omega}{\int_{-\infty}^{+\infty} \omega^2 A^2(\omega)d\omega}$$

for selected values of $M_T$.

8. A method of using an acoustic logging tool conveyed in a borehole in a formation for determining a characteristic of the formation, said logging tool having at least one source and a plurality of receivers, the method comprising:

(a) obtaining an effective tool modulus of said logging tool;

(b) measuring a Stoneley-wave slowness from array Stoneley-wave data;

(c) calculating a horizontal formation shear velocity, $V_{sh}$, as a function of said measured Stoneley-wave slowness and an estimated Stoneley-wave slowness, said estimated Stoneley-wave slowness computed using said effective tool modulus of said logging tool; and (d) calculating a transverse isotropy for said formation.

9. The method according to claim 8 wherein a formation shear-wave transverse isotropy parameter, $\gamma$, is calculated as $$\gamma = \frac{c_{66} - c_{44}}{2c_{44}} \approx 2\frac{V_{sh} - V_{sv}}{V_{sv} + V_{sh}}.$$

10. The method according to claim 8 wherein calculating said horizontal formation shear velocity, $V_{sh}$, further comprises minimizing a difference between said measured Stoneley-wave slowness and an estimated Stoneley-wave slowness computed from $$\overline{S}_{ST} = \frac{\int_{-\infty}^{+\infty} S_{ST}(\omega, V_{sh})\omega^2 A^2(\omega)d\omega}{\int_{-\infty}^{+\infty} \omega^2 A^2(\omega)d\omega}$$

for preselected values of $V_{sh}$.

11. The method according to claim 8 wherein obtaining said effective tool modulus of said logging tool further comprises modeling said logging tool as a cylindrically-shaped structure.

12. The method according to claim 8 wherein obtaining said effective tool modulus of said logging tool comprises:

i) measuring a Stoneley-wave slowness from array Stoneley-wave data in a formation where a horizontal shear wave velocity is known; and ii) calculating an effective logging tool modulus for said logging tool wherein said logging tool modulus is calculated as a function of said measured Stoneley-wave slowness and an estimated Stoneley-wave slowness, said estimated Stoneley-wave slowness computed using said known horizontal shear wave velocity.

13. The method according to claim 12 wherein calculating said effective tool modulus further comprises minimizing a difference between said Stoneley-wave slowness and said estimated Stoneley-wave slowness computed using said known horizontal shear wave velocity from $$\overline{S}_{ST} = \frac{\int_{-\infty}^{+\infty} S_{ST}(\omega, M_T)\omega^2 A^2(\omega)d\omega}{\int_{-\infty}^{+\infty} \omega^2 A^2(\omega)d\omega}$$

for selected values of $M_T$.

14. A method of using an acoustic logging tool conveyed in a borehole in a formation for determining a characteristic of the formation, said logging tool having at least one source and a plurality of receivers, the method comprising:

(a) measuring a Stoneley-wave velocity, $\overline{S}_{ST}$, from acquired array Stoneley-wave data;

(b) computing a spectrum $A(\omega)$ over a selected frequency range from said array Stoneley-wave data;

(c) integrating $\omega^2 A^2(\omega)$ to obtain a denominator value;

(d) selecting an initial horizontal shear velocity, $V_{sh}$, associated with said array Stoneley-wave data;

(e) calculating a dispersion curve $S_{ST}(\omega, V_{sh})$ for said initial horizontal shear velocity wherein $S_{ST}(\omega, V_{sh})$ is a function including an effective tool modulus of said logging tool;

(f) integrating $S_{ST}(\omega, V_{sh})$ over the frequency range of said spectrum $A(\omega)$ wherein $S_{ST}(\omega, V_{sh})$ is weighted by $\omega^2 A^2(\omega)$, and dividing by said denominator value to obtain an estimated $\overline{S}_{ST}$;

(g) obtaining a measure of difference between said average $\overline{S}_{ST}$ and said estimated $\overline{S}_{ST}$ obtained from said Stoneley-wave data;

(h) repeating steps (d)–(g) until said difference attains a predetermined minimum; and (i) outputting said selected $V_{sh}$ as the formation horizontal shear-wave velocity.

15. The method according to claim 14 wherein said formation horizontal shear-wave velocity is used to calculate a formation shear-wave transverse isotropy parameter.

16. The method according to claim 15 wherein the formation shear-wave transverse isotropy parameter, $\gamma$, is calculated as $$\gamma = \frac{c_{66} - c_{44}}{2c_{44}} \approx 2\frac{V_{sh} - V_{sv}}{V_{sv} + V_{sh}}.$$

17. The method according to claim 14 wherein obtaining said effective tool modulus of said logging tool further comprises modeling said logging tool as a cylindrically-shaped structure.

18. The method according to claim 14 wherein obtaining said effective tool modulus of said logging tool comprises:

i) measuring a Stoneley-wave slowness from array Stoneley-wave data in a formation where a horizontal shear wave velocity is known; and ii) calculating an effective logging tool modulus for said logging tool wherein said logging tool modulus is calculated as a function of said measured Stoneley-wave slowness and an estimated Stoneley-wave slowness, said estimated Stoneley-wave slowness computed using said known horizontal shear wave velocity.

19. The method according to claim 18 wherein calculating said effective tool modulus further comprises minimizing a difference between said Stoneley-wave slowness and said estimated Stoneley-wave slowness computed using said known horizontal shear wave velocity from $$\overline{S}_{ST} = \frac{\int_{-\infty}^{+\infty} S_{ST}(\omega, M_T) \omega^2 A^2(\omega) d\omega}{\int_{-\infty}^{+\infty} \omega^2 A^2(\omega) d\omega} \text{ for}$$

for selected values of $M_T$.

* * * * *